(12) United States Patent
Pekarski

(10) Patent No.: US 8,111,000 B2
(45) Date of Patent: Feb. 7, 2012

(54) METHOD AND AN OPERATION CONTROLLER FOR OPERATION OF A MERCURY VAPOUR DISCHARGE

(75) Inventor: Pavel Pekarski, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1252 days.

(21) Appl. No.: 11/722,808

(22) PCT Filed: Dec. 22, 2005

(86) PCT No.: PCT/IB2005/054388
§ 371 (c)(1),
(2), (4) Date: Jun. 26, 2007

(87) PCT Pub. No.: WO2006/072861
PCT Pub. Date: Jul. 13, 2006

(65) Prior Publication Data
US 2010/0002200 A1    Jan. 7, 2010

(30) Foreign Application Priority Data
Jan. 3, 2005 (EP) .................................... 05100006

(51) Int. Cl.
*H05B 37/02* (2006.01)
(52) U.S. Cl. ................... 315/291; 315/308; 315/360
(58) Field of Classification Search .................. 315/246, 315/291, 294, 297, 307–308, 350–351, 360, 315/158; 313/110, 492, 635, 637; 353/85, 353/121
See application file for complete search history.

(56) References Cited

U.S. PATENT DOCUMENTS

| | | | |
|---|---|---|---|
| 3,919,592 A | 11/1975 | Gray | |
| 5,027,034 A | 6/1991 | Ruby et al. | |
| 5,343,116 A | 8/1994 | Winsor | |
| 5,365,152 A * | 11/1994 | Ozawa et al. | 315/291 |
| 5,465,029 A * | 11/1995 | Hanazaki et al. | 315/308 |
| 5,485,061 A * | 1/1996 | Ukita et al. | 315/307 |
| 6,242,851 B1 | 6/2001 | Zhu et al. | |
| 6,376,998 B1 * | 4/2002 | Okamoto et al. | 315/291 |
| 6,538,383 B1 * | 3/2003 | Takeuchi | 313/637 |
| 7,023,144 B2 * | 4/2006 | Suzuki et al. | 315/246 |
| 7,084,585 B2 * | 8/2006 | Yamamoto et al. | 315/291 |
| 2002/0135324 A1 * | 9/2002 | Fujii et al. | 315/291 |
| 2002/0163315 A1 * | 11/2002 | Kaneko et al. | 315/246 |
| 2003/0034737 A1 | 2/2003 | Moench et al. | |
| 2004/0075392 A1 * | 4/2004 | Arimoto et al. | 315/59 |

OTHER PUBLICATIONS

Takashi Toyooka, et al: Illumination Control System for Adaptive Dynamic Range Control, SID International Symposium, San Jose, CA, US, May 25, 2004, pp. 174-177 XP007011825.

* cited by examiner

Primary Examiner — Tung X Le

(57) ABSTRACT

The invention describes a method for operation of a mercury vapour discharge lamp (1) in an image rendering system (30), wherein during a total operation time necessary for the presentation of an image content (C), the lamp (1) is deliberately operated in a saturated operating regime at least over a part of the total operation time according to a brightness parameter (BP) of the content (C), in which saturated operating regime mercury is condensed in an arc tube (2) of the lamp (1), and, at least over another part of the operation time, the lamp (1) is driven in an unsaturated operating regime, in which essentially the entire mercury evaporates. Thereby, the duration of the operation periods in the saturated and the unsaturated operation regime are chosen so that no significant blackening of the walls of the arc tube (2) arises during the total operation time of the lamp. The invention describes further an appropriate operation controller (27) for operation of a mercury vapour discharge lamp in an image rendering system (30) according to this method. Moreover a method for driving such an image rendering system and an appropriate image rendering system are described.

12 Claims, 5 Drawing Sheets

METHOD AND AN OPERATION CONTROLLER FOR OPERATION OF A MERCURY VAPOUR DISCHARGE

This invention relates to a method and to an operation controller for operation of a mercury vapour discharge lamp in an image rendering system, particularly a projector system, for the presentation of an image content, e.g. a video content, a slide show or other presentation. Furthermore, the invention relates to a method for driving such an image rendering system, and also to an appropriate image rendering system.

Mercury vapour discharge lamps comprise an envelope which consists of material capable of withstanding high temperatures, for example, quartz glass. From opposite sides, electrodes made of tungsten protrude into this envelope. The envelope, also called "arc tube" in the following, contains a filling consisting mainly of mercury, and also one or more rare gases. By applying a high voltage across the electrodes, a light arc is generated between the tips of the electrodes, which can then be maintained at a lower voltage. Owing to their optical properties, mercury vapour discharge lamps are preferably used, among others, in projector systems. For such applications, a light source is required, which is as point-shaped as possible. Furthermore, a luminous intensity—as high as possible—accompanied by a spectral composition of the light—as natural as possible—is desired. These properties can be optimally achieved with so-called "high pressure gas discharge lamps" or "HID lamps" (High Intensity Discharge Lamps) and, in particular, "UHP-Lamps" (Ultra High Performance Lamps).

Usually, the arc tube of such a high-pressure discharge lamp is of very small dimension, e.g. having a volume of some 10 mm$^3$. The high electrode load of such a lamp results in evaporation of tungsten from the electrodes, which is then deposited on the wall of the arc tube, leading to a very undesirable blackening of the arc tube. Such a blackening of the wall must be avoided, otherwise the wall temperature of the arc tube increases during the operational life time of the arc tube, due to increased absorption of thermal radiation, ultimately destroying the arc tube. In an attempt to avoid such wall blackening due to tungsten transport, precise amounts of oxygen and halogen, preferable bromine, have been added to the gas in the arc tube. Such additives to the lamp atmosphere prevent the tungsten, that evaporates from the electrodes, from the deposition on the bulb wall, since, in the cooler regions of the bulb close to the bulb wall, the tungsten atoms react chemically to form volatile oxyhalide molecules which are transported, e.g. through convection, to the hotter regions of the lamp near the electrodes, where the molecules dissociated. In this way, tungsten atoms are returned to the lamp electrodes in a regenerative manner. This transport cycle is usually called the "regenerative cycle".

A problem arises if the lamp is driven with an operational power much below the nominal power of the lamp. Below a certain power level, the mercury condenses, with the result that the halogen, e.g. bromine, is bonded by the liquid mercury. The regenerative cycle is thus no longer effective.

However, the possibility of gradual dimming of projector lamps—where the lamp power is determined by the video content—is desired for future generations of multimedia projectors. It is generally possible to dim the picture for darker scenes by appropriate control of the picture-rendering component of a projector, e.g. the display, as has been done to date. However, for a display with particular number of brightness levels (e.g. 8 bits), this technique results in part of the dynamic range being lost, since some of the bits cannot be used. Dimming the projector by means of the picture-rendering components thus leads to a loss in contrast. By dimming the light source, on the other hand, the entire contrast range offered by the picture-rendering components can be put to use, even in dark scenes. For example, the article "Illumination Control System for Adaptive Dynamic Range Control" by Takashi Toyooka et. al. in SID 04 Digest, 174, 2004 describes that the reduction of the lamp power would be the most preferable measure for dynamic reduction of the light output, but that it is not used because of the limitation imposed by the dimming range of UHP lamps. These limitations for dimming of UHP lamps are usually determined by mercury condensation, as described above.

Therefore, an object of the present invention is to provide an easy and cheap method and a corresponding operation controller for operation of a mercury vapour discharge lamp in an image rendering system, particularly a projector system, which allows a satisfactorily dimming of the lamp without decreasing the life span of the mercury vapour discharge lamp.

To this end, the present invention provides a method for operation of a mercury vapour discharge lamp wherein, during a total operation time necessary for the presentation of an image content, the lamp is deliberately operated in a saturated operating regime at least over a part of the total operation time according to a current brightness parameter of the content, in which saturated operating regime mercury is condensed in an arc tube of the lamp, and, at least over another part of the operation time, the lamp is driven in an unsaturated operating regime, in which essentially the entire mercury evaporates, and wherein the duration of the operation periods in the saturated and the unsaturated operation regime are chosen so that no significant blackening of the walls of the arc tube arises during the total operation time of the lamp.

The term "saturated operation regime" describes the operating regime of the lamp in which so much mercury condenses in the arc tube to interrupt the regenerative cycle, normally resulting in a significant blackening of the walls of the arc tube. On the other hand, the term "unsaturated operation regime" describes that operating regime in which the mercury has evaporated to such an extent that the regenerative cycle remains essentially undisturbed.

In the scope of the method according to the present invention, the operation regime of the lamp is, temporarily, deliberately dropped to a level considerably below the mercury condensation level, thereby allowing the lamp to be dimmed, so that in darker scenes of a video production and/or similar image content, the full contrast range can be attained, or at least a higher contrast than has been achieved using the methods up until now available. During a subsequent period of operation in the unsaturated mode, the regenerative cycle results in a removal of initial wall blackening. Experiments have shown—surprisingly—that alternating operation between extreme dimmed level and nominal power—i.e. with and without a regenerative cycle—results in a cleaning of the quartz wall. In other words, by constantly monitoring the periods in which the lamp is operated in the saturated and unsaturated operation regimes, and by judiciously switching between these states, it can be ensured that no significant blackening of the inner walls arises during the total operation time in which the presentation is shown.

The "total operation time" is given to mean the time required for the presentation of a certain content, and is not to be confused with the total life span or lifetime of the lamp. During the total lifetime of the lamp, blackening of the inner walls can arise due to other physical processes, as can be observed in the operating methods available to date. Using the method for dimming the lamp according to the present invention, on the other hand, no additional significant blackening of the inner walls takes place.

Switching from the saturated operating regime into the unsaturated operating regime is generally effected by preferably raising the lamp power to a level higher than the nominal power level. Since the mercury pressure in the arc tube is a function of the temperature of the lamp, it might suffice, under certain conditions and in the case of a moderately cool lamp, to lower the cooling, thereby raising the lamp temperature so that the mercury evaporates once more. However, for the sake of simplicity but without in any way implying a limitation, raising the lamp power in the following is to be understood to mean switching from the saturated regime into the unsaturated regime, even though in some cases this switching might be achieved or accompanied by a reduction in lamp cooling.

An appropriate operation controller for operation of a mercury vapour discharge lamp in an image rendering system comprises a brightness parameter determination unit for determining a brightness parameter of an image content to be presented by the image rendering system and a time-measurement unit for measuring an operation time of the lamp. Furthermore, the system must comprise an appropriate power control unit for controlling a lamp power, and optionally for controlling a cooling power for enforced cooling of the lamp. This power control unit must be realised in such a manner that, during a total operation time necessary for the presentation of the image content, the lamp is deliberately operated in the saturated operating regime, at least over a part of the total operation time, according to a brightness parameter of the content, and, at least over another part of the operation time, the lamp is driven in the unsaturated operating regime, and that the duration of the operating periods in the saturated and the unsaturated operation regime are chosen so that no significant blackening of the walls of the arc tube arises during the total operation time of the lamp.

The dependent claims and the subsequent description disclose particularly advantageous embodiments and features of the invention.

In a preferred embodiment of the invention, the time of continuous operation of the lamp in the saturated operating regime is monitored, and operation of the lamp is switched to the unsaturated operating regime, should the time of continuous operation of the lamp in the saturated operation regime have reached a predefined time limit.

The predefined time limit lies preferably between one minute and sixty minutes, depending on the lamp type. Typical duration of single dark scenes in a video content normally lie below the time limit of sixty minutes. The time limit of sixty minutes is too short for a significant wall blackening to arise. Numerous experiments have shown that a significant irreversible wall blackening arises only after driving the lamp uninterruptedly without a regenerative cycle, for a length of time exceeding this limit.

In order to clean an initial wall blackening after operating in dimming mode for, for example, a maximum of sixty minutes, the lamp power raised for a certain length of time, preferably at least one minute. Generally, such a one-minute period at nominal power is sufficient to clean the walls so that the lamp can be operated once again in saturated regime, should this is necessary, for example if the darker scene of the presentation content still persists.

Experiments have also shown, that, from a long-term point of view, the lamp should not be operated for the greater part in saturated operating mode. Therefore, in a preferred embodiment of the invention, the integral operation time of the lamp in saturated operation regime and the integral operation time of the lamp in unsaturated operating regime are monitored. Operation of the lamp is then switched from the saturated operating regime to the unsaturated operating regime if the ratio of the integral operation time of the lamp in the saturated operating regime to the integral operation time of the lamp in the unsaturated operation regime has reached a predefined value during a predefined monitoring period. The predefined monitoring period can be, for example, the total operation time required to present certain image content. In other words, the monitoring period is the time from turning on the image rendering system to turning it off again once the presentation is complete. Alternatively, the monitoring period can be a shorter or longer length of time, for example, several hours. In this case the operating times of a number of presentations, between which the device has been turned off, are added together.

The ratio of the times in which the lamp is driven in saturated operating regime, and the times in which the lamp is driven in unsaturated operating regime, should preferably not be greater than unity within a certain operating time of several hours. In other words, the lamp should not be driven in its extreme dimming mode for more than half of the total operating time, so that for at least half the time, the lamp should be driven in an operating mode in which the regenerative cycle can function.

In the easiest way to determine whether the lamp is driven in the saturated operation regime or in the unsaturated operation regime, a parameter representing the current lamp operating power is made use of. This can be, for example, the specified momentary lamp power value or the specified lamp current. These values can be determined at any time, so that they can easily be made use of. For example, a certain threshold level can be determined, so that for a lamp power above this threshold level, it can be assumed that the lamp is operating in unsaturated operating mode, and below this threshold level it can be assumed that the lamp is operating in saturated operating mode.

Nevertheless, owing to the thermal inertia of the lamp, the condensation and evaporation of mercury do not precisely follow the variations in power. The situation becomes even more complex if a forced cooling of the lamp is adapted to the power level. Thus, the duration of lamp operation with condensed mercury depends on the lamp power prehistory, and on the situation of each of the low and high power levels, and on the preceding history of the forced cooling intensity. The state of mercury condensation in the arc tube can therefore not be controlled exactly by simply monitoring the lamp power.

Therefore, in a more precise method, a lamp voltage and a lamp current are measured and the measurements are analysed to give an indication of the state of mercury saturation of the gas in the arc tube to determine whether the lamp is being driven in the saturated operation regime or in the unsaturated operation regime.

Thereby, preferably, a property of a current-voltage characteristic of the lamp is determined to give an indication of the state of mercury saturation. In the normal mode of operation, a mercury vapour discharge lamp displays negative current-voltage characteristics. A reduction of the lamp power, usually effected by reducing the current, results in an increase in operation voltage. However, it could be found that if some mercury has condensed, the voltage response to the variation in power (or current) is determined primarily by the variation in mercury pressure. This results in a different response of a lamp voltage to the reduction in current. Contrary to the case of an unsaturated lamp, the voltage of a saturated lamp drops due to mercury condensation and the resulting reduction in mercury pressure. Similar differences in voltage response behavior are observed in the case of an increase in current. This behavior can be explained as follows: if the current is reduced during the unsaturated regime, i.e. in normal mode of operation, the plasma between the electrodes cools to a lower temperature and the degree of ionization drops. As a result, the resistance of the lamp increases, as does the operation voltage. In a state of saturation, on the other hand, increasing the current results in an increased heat output of the lamp. This leads at first to mercury evaporation from the molten mass. The increase in evaporated mercury atoms in the gas also results in an increase of the resistance of the lamp. This effect plays a dominant role and leads to the increase in voltage if the current is increased for a saturated lamp.

This observation regarding the behavior of the voltage as a function of the level of current is put to good effect in the preferred method to determine, in an easy and uncomplicated manner, an indication of the state of mercury saturation in the bulb by simultaneously measuring the voltage and the current as well as the relationship of these measurements to one another.

Monitoring of the state of mercury saturation can, for example, take place in a separate monitoring unit which simply supplies a value representing the state of mercury saturation. This value can be then be applied by the operation controller to accordingly control the lamp and/or a cooling unit of the lamp, should one be present. Equally, such a monitoring unit can be integrated in the operation controller.

The method according to the invention can be applied to any image rendering system which comprises a mercury vapour discharge lamp. Operation of the image rendering system should preferably be such that, if on the one hand a brightness parameter of an image currently to be presented indicates that the lamp should be operated in the saturated operation mode, and on the other hand the lamp operational power must be increased to switch the operation of the lamp to the unsaturated operational regime to satisfy requirements according to the lamp operation method according to the invention, the lamp power is increased to switch the operation of the lamp to the saturated operation regime and a picture-rendering component of the image rendering system and/or a further component suitable for attenuating the light intensity of the image rendering system are adjusted accordingly, to compensate for the increased light intensity as a result of the increase in lamp power.

In other words, if a dark scene is of longer duration than the maximum permissible time in which the lamp can be driven in the saturated regime, the lamp power is raised for the duration of, for instance, one minute, and during this time the dimming is effected by, for example, appropriate adjustment of the image rendering components such as the display of a projector system. This has the disadvantage that the contrast is temporarily not as good, but the advantage over other systems available to date in that dark scenes can be shown with excellent contrast without thereby shortening the lifetime of the lamp.

Further components suitable for attenuating the light intensity of the image rendering system might be, for example, grey filters, apertures, polarisers or similar components that can usually be placed in the optical path between the lamp and the image rendering component. If need be, the attenuation of the light intensity can be made while maintaining a best possible contrast by judicious adjustment of the image rendering component in conjunction with adjustment of the other components Such a short switching from saturated into unsaturated regime owing to the requirements according to the control method described is preferably effected such that the increase in lamp power and the corresponding dimming by means of the image rendering component or the other components take effect only slowly. Once the regenerative cycle has been active for sufficiently long, the lamp power is once again slowly reduced, and the image rendering component is likewise slowly returned to its normal level of operation.

An appropriate image rendering system, in addition to a conventional image rendering component and, further optional components suitable for attenuating the light intensity of the image rendering system, must also comprise an appropriate system control unit, which is so constructed that it first checks whether the brightness parameter of an image currently to be presented indicates that the lamp should be operated in the saturated operation mode, but also checks whether the lamp operational power must be increased to switch the operation of the lamp to the unsaturated operation regime in order to satisfy the requirements according to the above explained lamp operation method. Furthermore, the system control unit must be constructed in such a way that it can increase the lamp operational power in such a case, and correspondingly adjust the image rendering component and/or the other components of the image rendering system suitable for attenuating the light intensity in order to further compensate for the increase in light intensity of the lamp.

Other objects and features of the present invention will become apparent from the following detailed descriptions considered in conjunction with the accompanying drawings. It is to be understood, however, that the drawings are designed solely for the purposes of illustration and not as a definition of the limits of the invention. In the drawings, wherein like reference characters denote the same elements throughout:

The dimensions of the objects in the figures have been chosen for the sake of clarity and do not necessarily reflect the actual relative dimensions.

Figure 1:
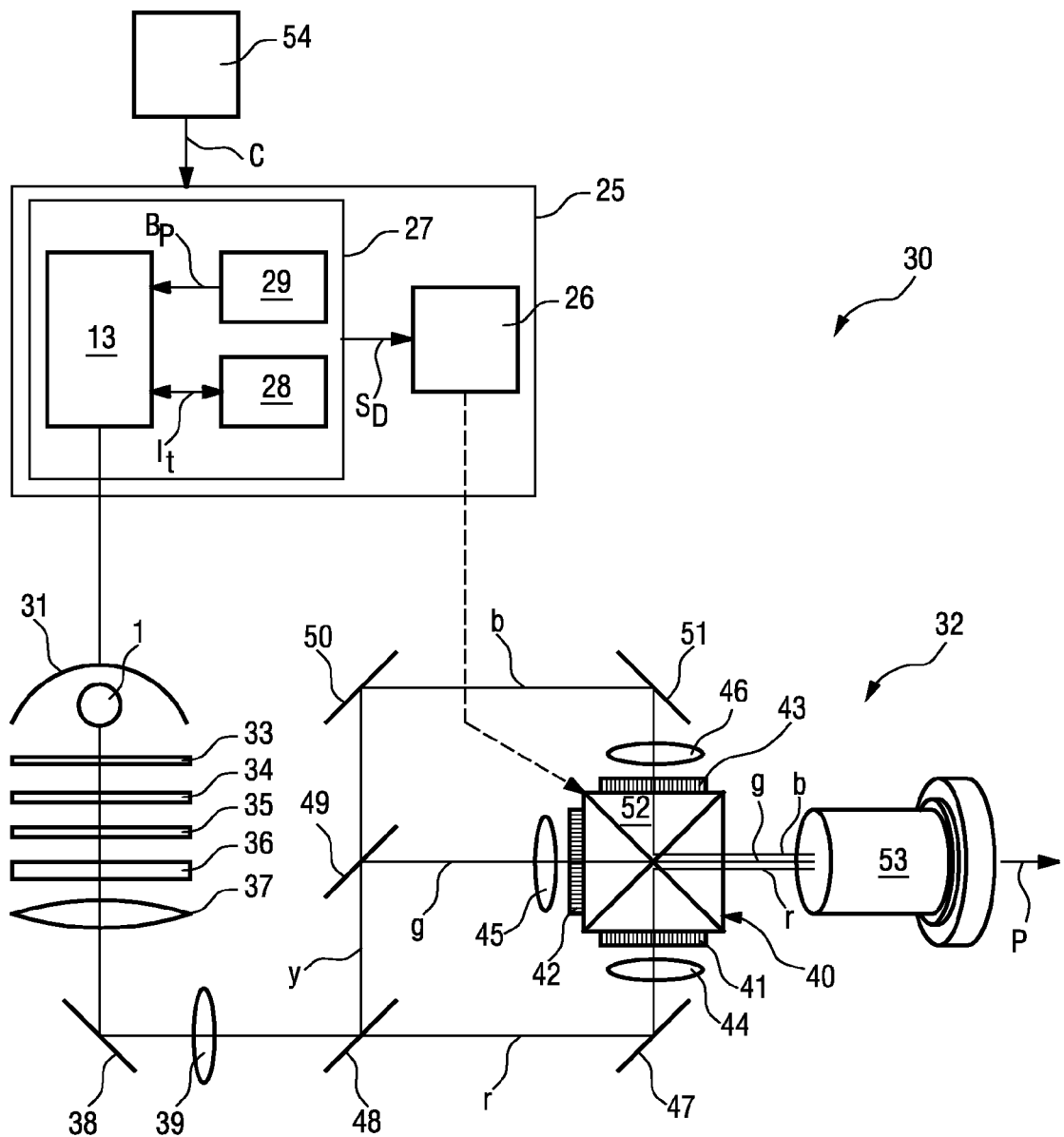
FIG. 1 shows a schematic representation of a projector system according to an embodiment of the invention.

The projection system 30 shown in FIG. 1 comprises a light source in the form of a mercury vapour discharge lamp 1, arranged in a reflector 31. Instead of just one lamp 1 and one reflector 31, the projection system can comprise several lamps/reflectors.

A cone of light is directed, via the reflector 31, onto an ultraviolet filter 33, which in this case is the first component positioned in the optical path of the radiated light behind the lamp 1, and is followed by two integrators 34, 35 and a polarisation conversion system 36. A collimator lens 37 follows, from which the light is directed to an infra-red filter 38 before continuing through a lens 39.

The beam of light thus prepared then enters a beam splitting system 32 comprising several dichroic colour filters 48, 49 and mirrors 47, 50, 51. At the entrance to this system 32, the first dichroic filter 48 splits the beam of light into a red component r and a yellow component y. The red component r is then directed, be means of a mirror 47 and a field lens 44 to an image rendering component 40. This picture rendering component 40 comprises a dichroic prism 52, on whose three sides picture rendering elements 41, 42, 42—in this case LCD displays 41, 42, 43—are arranged. Each of these displays 41, 42, 43 serves to generate a picture in a certain colour red r, green g, or blue b. The red component r is directed through the field lens 44 accordingly to display 41, dedicated to the red component of the beam of light.

The yellow component y is split in a second dichroic colour filter 49 into a green component g and a blue component b. The green component g is then directed, via a field lens 45, to a display 42 dedicated to the green image component. The blue component b arrives at a field lens 46 via two further mirrors 50, 51, and is directed through the field lens 46 to the display 43 dedicated to the blue image component.

By appropriate control of the prism 52, the red, green and blue images are combined to give a colour image, which is beamed by means of a projection lens 53 in the direction of projection P.

Control of the entire system is achieved here with a system control unit 25. This system control unit 25 receives an image content C for presentation, usually from an external device 54, such as a DVD player, a PC, a laptop or similar. An image rendering control unit 26 controls, according to the image content C, the picture rendering unit 40—i.e. the individual displays 41, 42, 43 and the dichroic prism 52—so that the image is made visible by the projection system 30.

A person skilled in the art is familiar with the functionality of the individual components, in particular the integrators 34, 35 of the polarisation conversion system 36, the dichroic colour filters 48, 49 and the image rendering unit 40 with its dichroic prism 52 and displays 41, 42, 43, and is also familiar with the possible methods of control for mixing the red, green and blue image components. These elements need therefore not be dealt with in more detail at this point. Neither is the invention limited to the colour image production procedure described by FIG. 1.

For control of the lamp, the system control unit 25 features an operation controller 27, which comprises, among others, a brightness parameter determination unit 29, which determines from the image content C, directly or from accompanying meta-data, a brightness parameter BP of the image content C, which represents the total brightness of the image to be shown. Using this brightness parameter BP, a lamp control unit 13 of the operation controller 27 can be controlled in order to adjust the brightness of the lamp, for example by dimming the lamp in order to optimally render a dark scene. The exact functionality of the operation controller 27 and the various components is described in more detail in the following.

FIG. 1 shows only the components that are relevant to the invention. Evidently, such a system control unit 25 will also comprise all further components that are usually required for the control of a projector system. An operation controller 27 according to the invention, or a system control unit 25 as described above, are preferably implemented as software running on a programmable microprocessor of an image rendering system. This has the advantage that new devices already in production can be equipped with the functionality according to the invention, by simply installing the appropriate control software. Equally, already existing image rendering systems can easily be upgraded with a software update.

Figure 2:
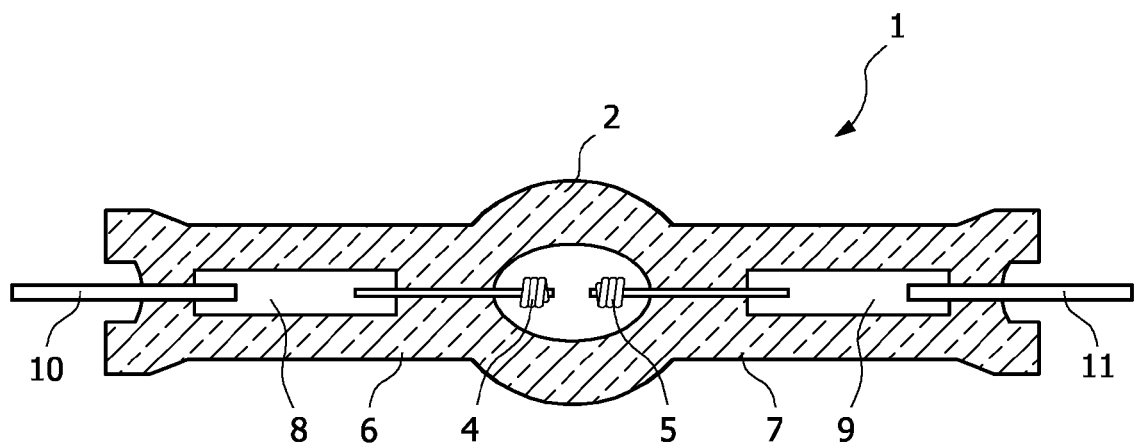
FIG. 2 shows a longitudinal through a high-pressure mercury vapour discharge lamp.

A high-pressure mercury vapour discharge lamp 1 usable for the projector system in FIG. 1 is shown in FIG. 2. The lamp 1 features an elliptical arc tube 2 of quartz glass. The ends of the arc tube 2 are adjoined by cylindrical quartz parts 6, 7, into which molybdenum foils 8, 9 are sealed in a vacuum-tight manner. The inner ends of the molybdenum foils 8, 9 are connected to tungsten electrodes 4, 5 which protrude into the arc tube 2 and carry wrappings or coils of tungsten on the ends which protrude into the bulb. The outer ends of the molybdenum foils 8, 9 are connected to current supply wires 10, 11 which lead to the exterior of the lamp.

The arc tube 2 is filled with rare gas and mercury. Furthermore, a small amount of bromine is also present in the arc tube 2. The principle of operation of such a lamp 1, and particularly the regeneration cycle which, with the aid of bromine addition to the gas, ensures that tungsten does not settle on the inner walls of the arc tube, has already been explained in detail above. That mercury condensing into liquid form also presents a problem, owing to the fact that bromine atoms are bound by liquid mercury, with the result that the regenerative cycle is then interrupted, has also already been explained.

Figure 3:
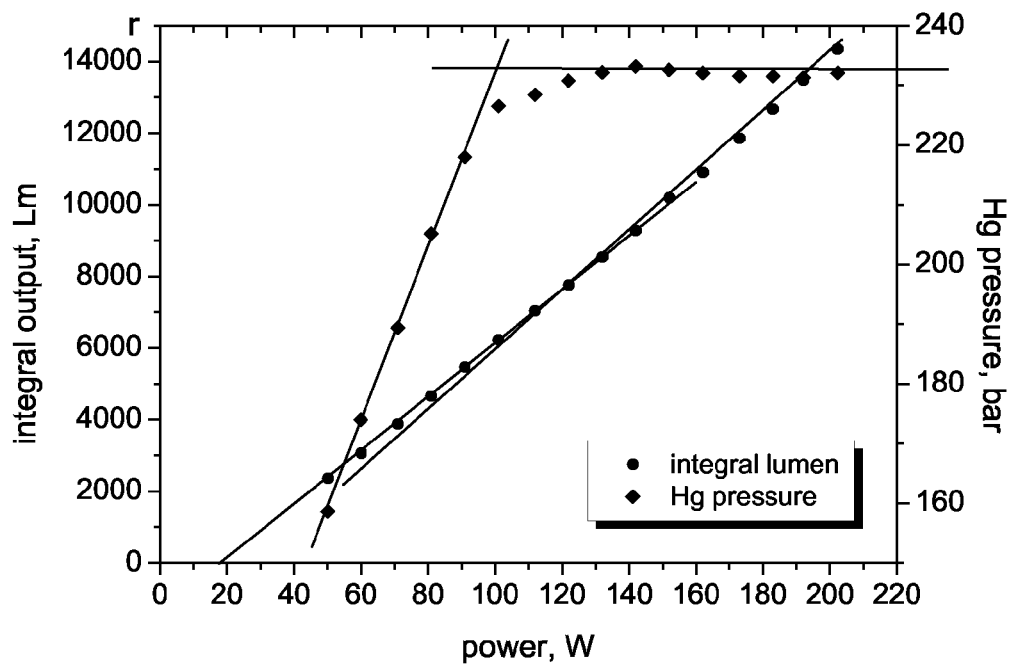
FIG. 3 shows a graph of the integral light output and mercury pressure vs. operational power for 200 Watt UHP burner.

FIG. 3 shows the relationship between mercury pressure and operational power for a 200 W UHP lamp. Mercury (Hg) pressure is indicated by the lozenge-shaped markers. It can be seen clearly that, below an operational power of 120 W, mercury starts to condense. FIG. 2 also shows the relationship between integral light output and the operational power (round markers). This illustrates that, for a 200 W UHP lamp, reduction of the light output is limited to 30% when one wishes to ensure that the UHP lamp does not operate in the saturated regime in which mercury is present in liquid form. The same problem arises with the usual 120 W UHP lamps. These cannot be dimmed below 100 W if condensation of mercury is to be avoided.

To allow dimming of the lamp below this threshold and at the same time to avoid damage to the lamp or a reduction of its lifespan through further blackening, the state of the lamp is continually monitored by the operation controller 27 which ensures that the times in which the lamp 1 is driven in saturated regime, and the times in which it is driven in unsaturated regime, are chosen appropriately. These times are controlled in such a way, so that any blackening effects which might arise during operation in saturated regime are cleaned again in the unsaturated regime operation, so that no significant blackening occurs.

As already described above, a lamp power threshold level $P_T$ can be chosen for this control. It can be assumed that, below this lamp power threshold level $P_T$, the lamp is operating in saturated regime. Above this threshold level, it can be assumed that the lamp is being driven in unsaturated regime, in which the regenerative cycle is active. For example, as can be seen from the graph in FIG. 3, a threshold level of 130 W can be chosen for a 200 W UHP lamp.

Figure 4:
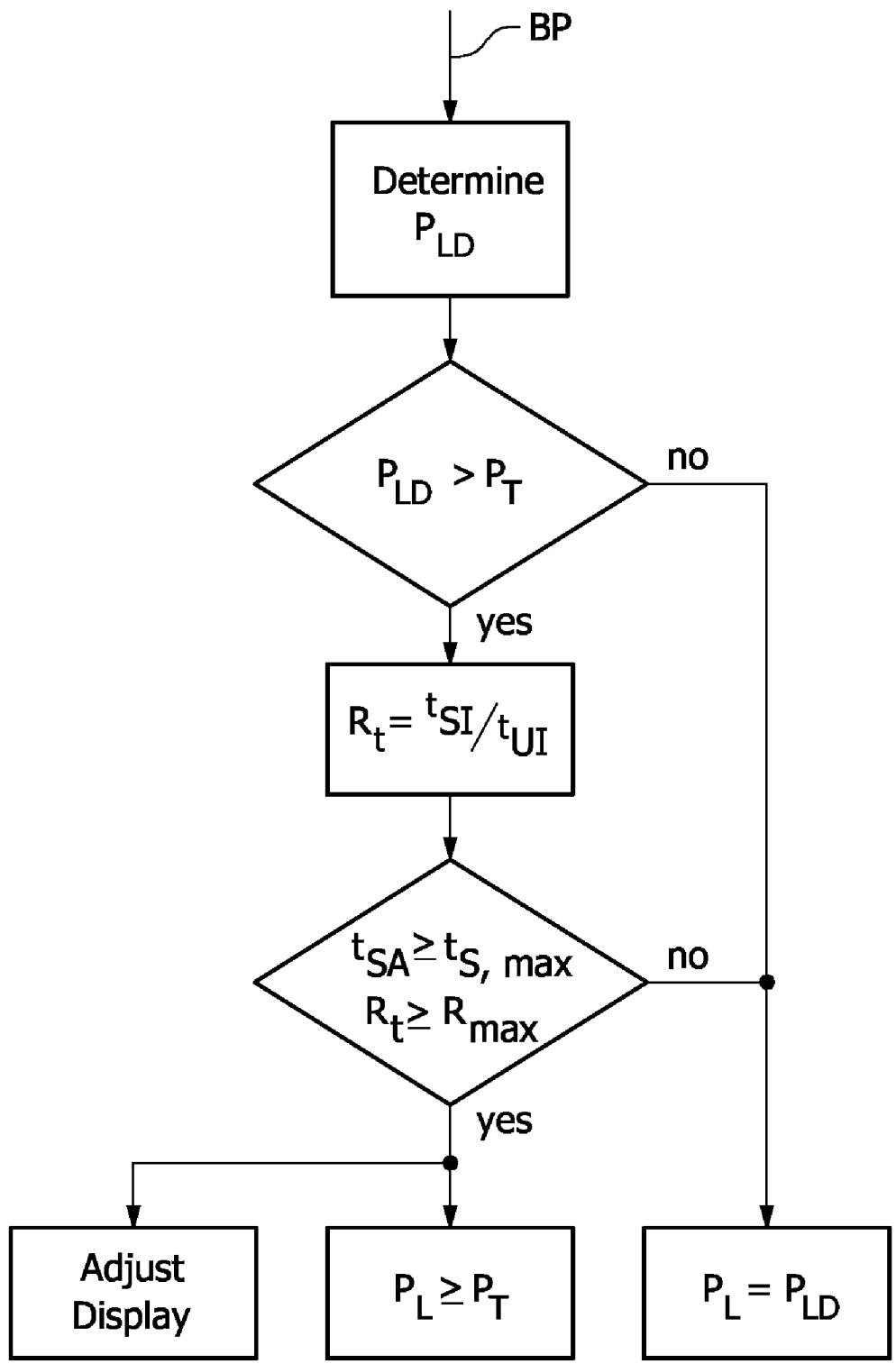
FIG. 4 shows a flow chart, illustrating a possible sequence of steps for driving the components of an image rendering system according to a function of a brightness parameter of the image content to be rendered.

The control mechanism applied in the control is described in the following with the aid of FIG. 4. As already explained above, the operation controller 27 features a brightness parameter determination unit 29, which can determine a brightness parameter BP from the image content C to be shown. This brightness parameter BP is used to determine, in a first step, a desired lamp operational power $P_{LD}$. Normally, the lamp 1 would have to be driven with this desired lamp operational power $P_{LD}$ in order to attain the correct light intensity for optimal rendering of the current image.

However, it is first checked, by the control mechanism, whether the current desired lamp operational power $P_{LD}$ is greater than the threshold power $P_T$. If this is not the case, the actual lamp power $P_L$ is adjusted to give the desired lamp operational power $P_{LD}$.

Otherwise, the ratio $R_T$ of the integral operation time $t_{SI}$, of the lamp 1 in the saturated operation regime to the integral operation time $t_{UI}$ of the lamp 1 in the unsaturated operation regime is calculated. A time measuring unit 28 of the operation controller 27 provides the necessary time information $I_T$ (cf. FIG. 1).

In a following step, it is checked whether the actual duration of time $t_{SA}$, in which the lamp is already being driven in saturated regime, has reached or exceeded a maximum time $t_{S, max}$. The maximum time $t_{S, max}$ can be chosen to be, for example, an hour. At the same time, it is checked whether the ratio $R_T$ of the integral operation time $t_{SI}$, of the lamp in the saturated operation regime to the integral operation time $t_{UI}$ of the lamp in the unsaturated operation regime is reached or exceeded a maximum time $R_{max}$. Only when both conditions are answered in the negative can the current lamp operation power $P_L$ be adjusted to give the desired lamp operation power $P_{LD}$. Otherwise, an actual lamp operation power $P_L$ equal to or above the threshold power $P_T$ is chosen. Furthermore, the image rendering unit 40 and/or the individual displays 41, 42, 43 are adjusted accordingly with the aid of the image rendering control unit 26, in order to compensate for the increased light intensity of the lamp, and to react to the brightness parameter BP. Insofar as such a dimming of the image rendering unit 40 or the display becomes necessary, the operation controller 27 provides image rendering control unit 26 with a suitable signal $S_D$ (cf. FIG. 1).

As has already been explained above, an even better control can be achieved by determining, as quickly as possible, the state of mercury saturation in the arc tube 2, in order to determine whether the lamp 1 is being driven in saturated operation regime or in unsaturated operation regime, instead of simply using a threshold value $P_T$. In this case, the first condition of FIG. 4 is replaced by a different condition, which better describes the state of mercury condensation in the arc tube 2.

Figure 5:
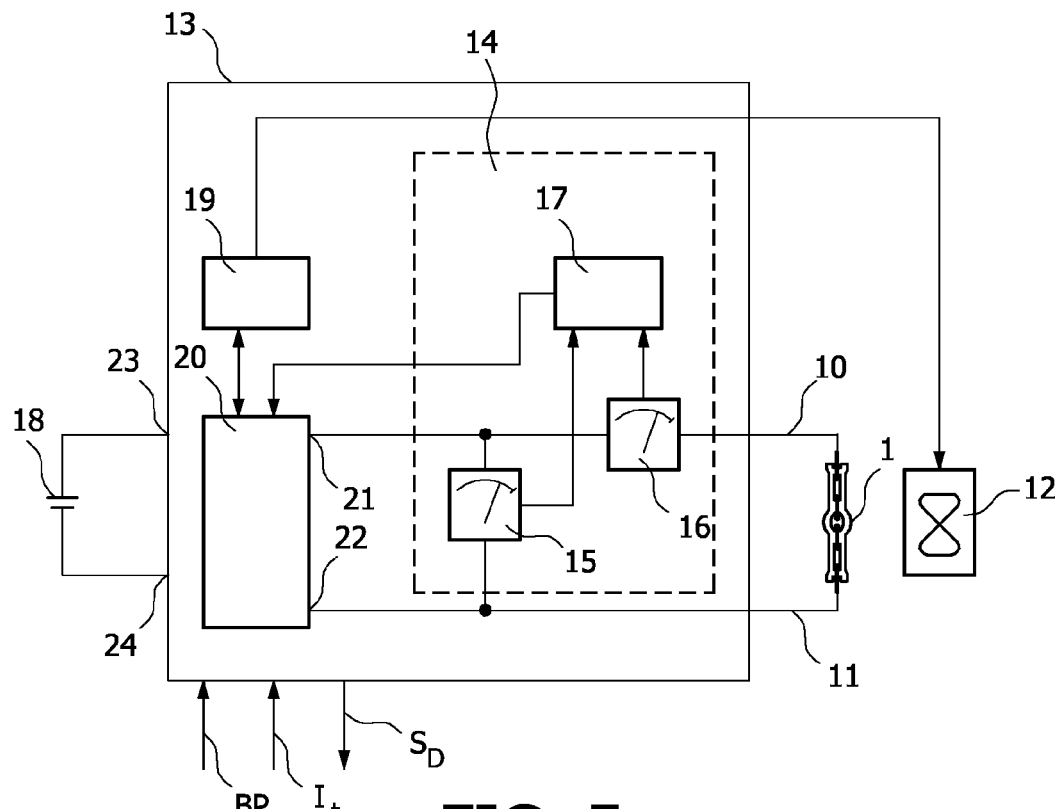
FIG. 5 shows a schematic block diagram of an operation controller according to the invention.

A lamp control unit 13 with a monitoring arrangement 14, used for a more precise monitoring of the state of mercury saturation in the arc tube 2, will be described in the following with the aid of FIG. 5. This figure illustrates, schematically, the components relevant to the monitoring method. This lamp control unit 13 can also comprise any other components usually required for the operation of a mercury vapour discharge lamp. Such a lamp control unit is often also called a "lamp driver".

The heart of the lamp control unit 13 is a power supply unit 20 with two connectors 21, 22, which are connected to the lamp 1 by means of the leads 10, 11. In the present case, the lamp 1 is a cooled UHP lamp 1, equipped with a cooling unit 12. The cooling unit 12 is controlled by a cooling control unit 19, which is also part of the lamp control unit 13. The lamp control unit 13 is connected to a power supply 18 by means of two connectors 23, 24.

According to the invention, the lamp control unit 13 comprises a monitoring arrangement 14. This in turn comprises a voltage measuring unit 15, which is connected in parallel to the lamp 1 to the poles 21, 22 of the power supply unit 20, and which measures the voltage between the leads 10, 11 of the lamp 1. Furthermore, a current measuring unit 16, placed in the leader 10 to the lamp 1, measure the current flowing through the lamp 1. This current measuring unit 16 can, for example, measure the current using induction.

The monitoring arrangement 14 also comprises an analysing unit 17, to which the voltage measuring unit 15 and the current measuring unit 16 are connected, and to which they report their measurements. In the analysing unit 17, the measurement values of the voltage measuring unit 15 and the current measuring unit 16 are recorded, and the resulting current and voltage curves are analysed.

Figure 6:
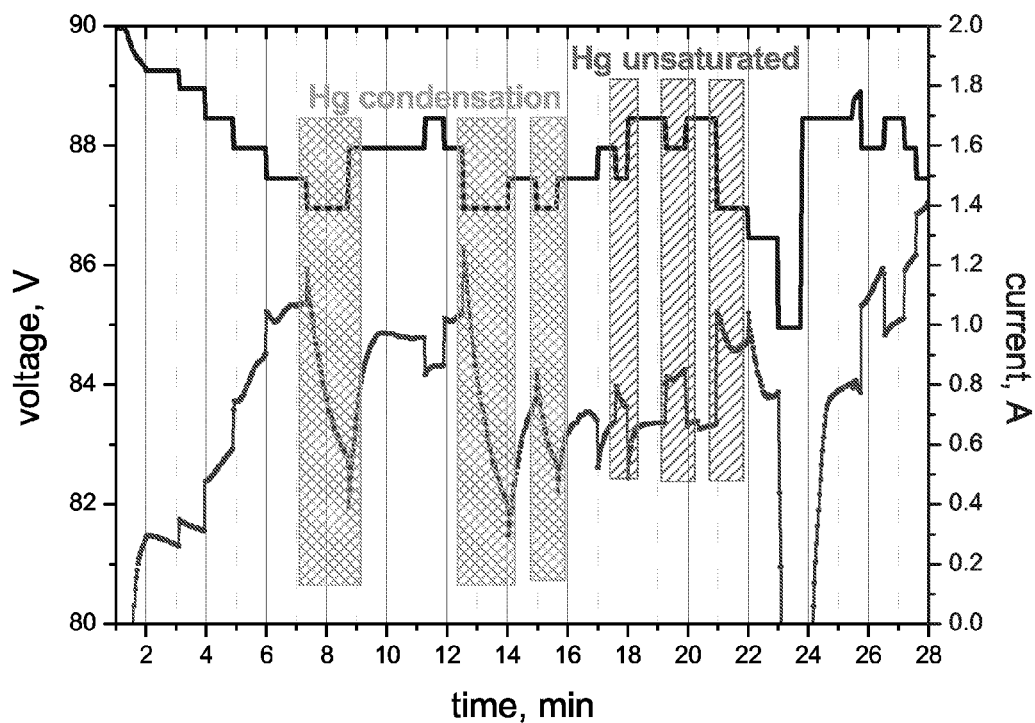
FIG. 6 shows the voltage changes of a 120 Watt UHP lamp during variation of the lamp power.

FIG. 6 shows an example of current (upper) and voltage (lower) curves recorded in parallel over the same period of time. In certain regions, cross-hatched differently to distinguish them from each other, the behavior of voltage as a function of the change in lamp power—and therefore a change in lamp current—is analysed. Thereby, it is determined whether the voltage drops when the current is reduced, or whether the voltage increases. By making this observation alone, it is possible to determine the state of mercury saturation in the arc tube.

As is evident from FIG. 6, the behavior of the voltage as a function of a change in current, in those regions in which mercury condensation is occurring, differs clearly from its behavior in the regions in which the lamp is operating in an unsaturated regime. Whilst a reduction in current results in a corresponding drop in voltage during the mercury condensation regime, and increasing the current results in a corresponding rise in voltage, a reduction in current during the mercury unsaturated regime leads to an increase in voltage, and vice versa. Therefore, the lamp exhibits a positive current-voltage characteristic in the mercury condensation regime, whereas it exhibits the—normal—negative current-voltage characteristic during the mercury unsaturated regime. By means of an exact evaluation of the relationship of the voltage reduction as a function of a reduction in current, also conclusions may be drawn about the quantitative mercury condensation. With the aid of the monitoring arrangement 14, it is therefore possible to directly determine the state of mercury saturation in the lamp 1.

In the embodiment according to FIG. 5, the decision as to whether the lamp 1 is to be dimmed below a certain power can be made directly in the lamp control unit 13. In this case, the lamp power supply unit 20 is equipped with a suitable microprocessor. The analysing unit 17 of the monitor arrangement 14 delivers a suitable value, representing the state of mercury condensation in the arc tube 2, to the power supply unit 20 of the lamp. Time information $I_T$ as well as the brightness parameter BP are supplied to the lamp control unit 13 by the time measuring unit 28 and/or the brightness parameter determination unit 29. Equally, the lamp control unit 13 can provide the signal $S_D$ to the image rendering control unit 26, whenever dimming by the image rendering unit 40 is necessary. In an embodiment not shown in the diagrams, the analysing unit 17, as well as the voltage measuring unit 15 and current measuring unit 16, are incorporated in the power supply unit 20.

Figure 7:
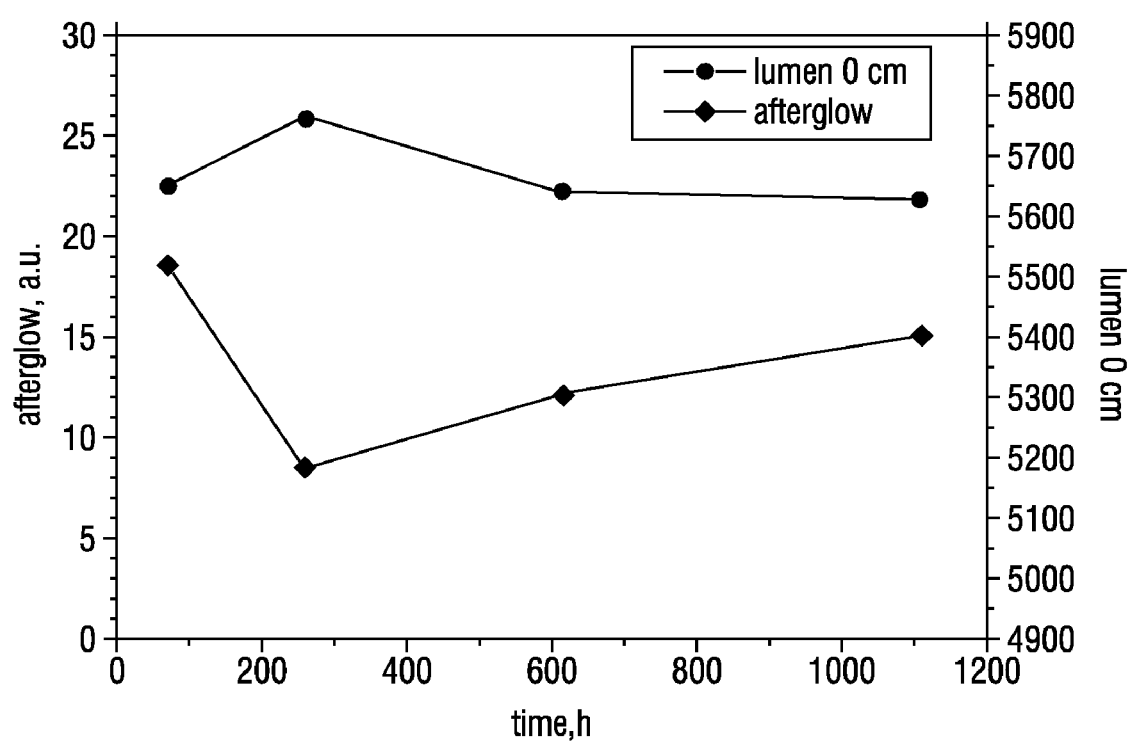
FIG. 7 shows a graphic representation of measurements of wall blackening and integral lumen for a 120 W UHP lamp, which was operated with periodic power variations between 130 W and 80 W in a manner according to the invention.

FIG. 7 shows, in an upper curve (round markers), the integral lumen for a 120 W UHP lamp, which was driven, according to the invention, with periodic variations in power between 130 W and 80 W. The period of power modulation was varied between 15 and 40 minutes, so that the duration of extreme dimming and regenerative periods was between 7 and 20 minutes. The integral lumen (lumen 0 cm) was measured with an integrating sphere.

As the measurements show, the lamp does not exhibit any noticeable reduction in lamp power, even after 1,100 hours of operation. In this time, the lamp was driven for a total of 450 hours in state in which the regenerative cycle was not active, since the bromine was bound in liquid mercury.

The lower curve (lozenge-shaped markers) in this diagram shows measurement values for the so-called "after glow", which is an indication for wall-blackening. This measurement uses the fact that, after switching off the lamp, metallic constituents of the lamp continue to glow after the lamp has been switched off. Tungsten which has been deposited on the inside of the bulb glows with a red light. Using a suitable diode, it is possible to estimate how much tungsten has been deposited on the glass. This measurement shows clearly that, even after 1,100 hours of operation using the method according to the invention, no significant wall blackening has taken place.

This demonstrates that, for example, with the aid of the invention, the adaptive dynamic range control described earlier can be realised by dimming the lamp, and that optimum performance can thereby be attained.

Although the present invention has been disclosed in the form of preferred embodiments and variations thereon, it will be understood that numerous additional modifications and variations could be made thereto without departing from the scope of the invention. For example, the operation controller does not necessarily have to be realised as a stand-alone unit, since the components which comprise the operation controller can be distributed over other functional units of the control unit, and might be used by these other functional units to fulfill other purposes. This applies in particular to the time measuring unit. For the sake of clarity, it is also to be understood that the use of "a" or "an" throughout this application does not exclude a plurality, and "comprising" does not exclude other steps or elements.

The invention claimed is:

1. A method for operation of a mercury vapour discharge lamp (1) in an image rendering system (30), wherein
    during a total operation time necessary for the presentation of an image content (C), the lamp (1) is deliberately operated in a saturated operating regime at least over a part of the total operation time according to a brightness parameter (BP) of the content (C), in which saturated operating regime mercury is condensed in an arc tube (2) of the lamp (1), and,
    at least over another part of the operation time, the lamp (1) is driven in an unsaturated operating regime, in which essentially the entire mercury evaporates,
    and wherein the duration of the operation periods in the saturated and the unsaturated operation regime are chosen so that no significant blackening of the walls of the arc tube (2) arises during the total operation time of the lamp (1).

2. The method according to claim 1, wherein a time ($t_{SA}$) of continuous operation of the lamp (1) in the saturated operating regime is monitored, and operation of the lamp (1) is switched to the unsaturated operating regime if the time ($t_{SA}$) of continuous operation of the lamp (1) in the saturated operation regime has reached a predefined time limit ($t_{S,\ max}$).

3. The method according to claim 1, wherein the integral operation time ($t_{SI}$) of the lamp (1) in the saturated operating regime and the integral operation time ($t_{UI}$) of the lamp(1) in the unsaturated operating regime are monitored and operation of the lamp (1) is switched from the saturated operating regime to the unsaturated operating regime if the ratio ($R_t$) of the integral operation time ($t_{SI}$) of the lamp (1) in the saturated operating regime to the integral operation time ($t_{UI}$) of the lamp (1) in the unsaturated operating regime has reached a predefined value ($R_{max}$) during a predefined monitoring period.

4. The method according to claim 1, wherein a parameter ($P_L$, $P_{LD}$) which represents the current lamp operating power is used to determine whether the lamp (1) is driven in the saturated operation regime or in the unsaturated operation regime.

5. The method according to claim 1, wherein a lamp voltage and a lamp current are determined and analysed to give an indication of the state of mercury saturation of the gas in the arc tube (2) to determine whether the lamp (1) is driven in the saturated operation regime or in the unsaturated operation regime.

6. The method according to claim 5, wherein a property of a current-voltage characteristic of the lamp (1) is determined to give an indication of the state of mercury saturation.

7. A method according to claim 1, wherein to switch the operation from the saturated operation regime to the unsaturated operation regime the lamp operation power ($P_L$) is increased and/or a forced cooling of the lamp (1) is reduced.

8. A method for driving an image rendering system (30) comprising a mercury vapour discharge lamp (1), wherein the mercury vapour discharge lamp (1) is driven according to claim 1.

9. The method according to claim 8, wherein if the brightness parameter (BP) of the image content (C) currently to be presented indicates that the lamp (1) should be operated in the saturated operation mode, and the lamp operational power ($P_L$) must be increased to switch the operation of the lamp (1) to the unsaturated operational regime to satisfy requirements according to the method of claim 1,
    the lamp operational power ($P_L$) is increased to switch the operation of the lamp (1) to the saturated operation regime and a picture-rendering component (40) of the image rendering system (30) and/or a further component suitable for attenuating the light intensity of the image rendering system (30) are adjusted accordingly.

10. An operation controller (27) for operation of a mercury vapour discharge lamp in an image rendering system (30), comprising
    a brightness parameter determination unit (29) for determining a brightness parameter (BP) of an image content (C) to be presented by the image rendering system (30),
    a time-measurement unit (28) for measuring an operation time ($t_{SA}$, $t_{SI}$, $t_{UI}$) of the lamp;
    a power control unit (13) for controlling a lamp power ($P_L$), and optionally for controlling a cooling power for forced cooling of the lamp (1), which power control unit (13) is realised in such a manner that, during a total operation time necessary for the presentation of the image content (C), the lamp is deliberately operated in a saturated operating regime, at least over a part of the total operation time, according to the brightness parameter (BP) of the content (C), in which saturated operating regime mercury is condensed in an arc tube (2) of the lamp (1),
    and that, at least over another part of the operation time, the lamp (1) is driven in an unsaturated operating regime, in which essentially the entire mercury evaporates,
    and that the duration of the operation periods in the saturated and the unsaturated operation regime are chosen so that no significant blackening of the walls of the arc tube (2) arises during the total operation time of the lamp (1).

11. An image rendering system (30) comprising a mercury vapour discharge lamp (1) and an operation controller (27) according to claim 10.

12. An image rendering system according to claim 11, comprising
    a picture-rendering component (40),
    optionally a further component suitable for attenuating the light intensity of the image rendering system (30),
    a system control unit (25) which is realised in such a manner that,
    if a brightness parameter (BP) of an image currently to be presented indicates that the lamp (1) should be operated in the saturated operation mode, and the lamp operational power ($P_L$) must be increased to switch the operation of the lamp (1) to the unsaturated operational regime to satisfy requirements according to the method claim 1, the lamp operational power ($P_L$) is increased to switch the operation of the lamp (1) to the saturated operation regime and the picture-rendering component (40) and/or the further component suitable for attenuating the light intensity of the image rendering system (30) are adjusted accordingly.

* * * * *